Sept. 18, 1951 — I. W. CORDER — 2,568,056

BEARING SEAL

Filed Feb. 11, 1947

INVENTOR.
Ishmael W. Corder
BY
Wayland D. Keith
HIS AGENT.

Patented Sept. 18, 1951

2,568,056

UNITED STATES PATENT OFFICE 2,568,056

BEARING SEAL

Ishmael W. Corder, Iowa Park, Tex., assignor to Thompson Tool Company, Iowa Park, Tex., a copartnership Application February 11, 1947, Serial No. 727,883

5 Claims. (Cl. 288—2)

This invention relates to improvements in bearing seals, and more particularly to seals for self aligning bearings.

Many machines are provided with self aligning bearings for the shafts thereof because these eliminate the necessity for a careful machining of the bearing mountings so that the bearings will be in precise relation to each other. This leaves the shafts that are mounted therein slightly out of exact right angle relation to the plane of the bearing in many instances, and makes it extremely difficult to provide close packing or sealing for the bearings when this is necessary. Where bearings are used to support a shaft, as the shaft of a shale separator, the mud and foreign matter encountered in the separator, often works into the bearings because of the lack of an adequate seal therefor.

The object of this invention is to improve the construction of bearing seals, particularly for self aligning bearings, to provide an adequate seal around the shaft adjacent the bearings which will exclude mud and foreign matter therefrom.

This object may be acomplished by providing a yieldable sealing cup attached to one side of the bearing and surrounding the shaft, having provision thereon for effecting a tight seal around the shaft in different angular positions thereof relative to the bearing that will exclude mud and foreign matter from the bearing and at the same time retain the lubricant therein in an effective manner.

Multiple lips are provided preferably on the inner edge of the sealing cup to insure of an accurate fit with the shaft in different positions thereof.

This form of the invention is illustrated in the accompanying drawings in which.

Figure 3:
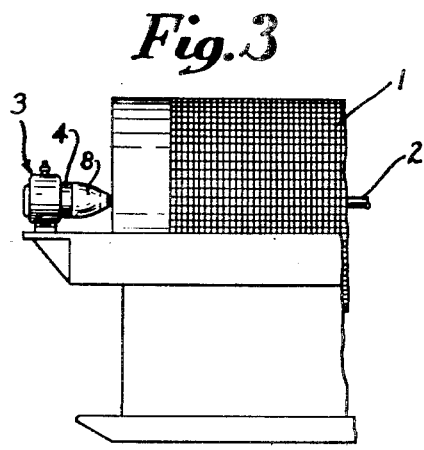
Fig. 3 is a partial side elevation of a shale separator showing the invention applied thereto.

The invention is shown as used in connection with a bearing of a shale separator, merely for purposes of illustration. The shale separator is designated generally by the numeral 1 in Fig. 3 and includes a rotary shell supported on a shaft 2 extending lengthwise therethrough and journaled at opposite ends in self aligning bearings 3. Each of the bearings 3 mounts the shaft in a universal joint capable of angular adjustment to different positions as indicated in dotted lines in Fig. 1.

The bearings 3 become worn unduly when mud or other foreign matter follows along the shaft 2 from the shell and enters the bearings. It has been difficult heretofore to provide an adequate seal for the bearings in the different angular positions of the shaft 3.

The bearing 3 is shown as provided with a collar 4 surrounding a flange 5 on one side of the bearing 3 and secured to said flange by a set screw 6. The collar has a close fit with the flange 5 to form a fluid tight connection therewith, and may be detachable therefrom upon loosening the screw 6.

The periphery of the collar 4 has a series of circumferential grooves 7 therein interfitting with the inner edge of a flexible cup 8 which is fitted over the outer end of the collar 4 and projects along the shaft 3 and is preferably vulcanized to the collar 4 in order to obtain a tight connection with the collar. Any other suitable means of connecting the cup and the collar rigidly together may be used as desired. This cup 8 preferably has a neck extending axially outward and radially inward a distance of at least one-half the diameter of the cup or neck at the larger end and is formed of rubber, synthetic rubber, or other elastic material, having freedom for yielding movement so that it may adjust itself to the angular positions of the shaft.

Figure 1:
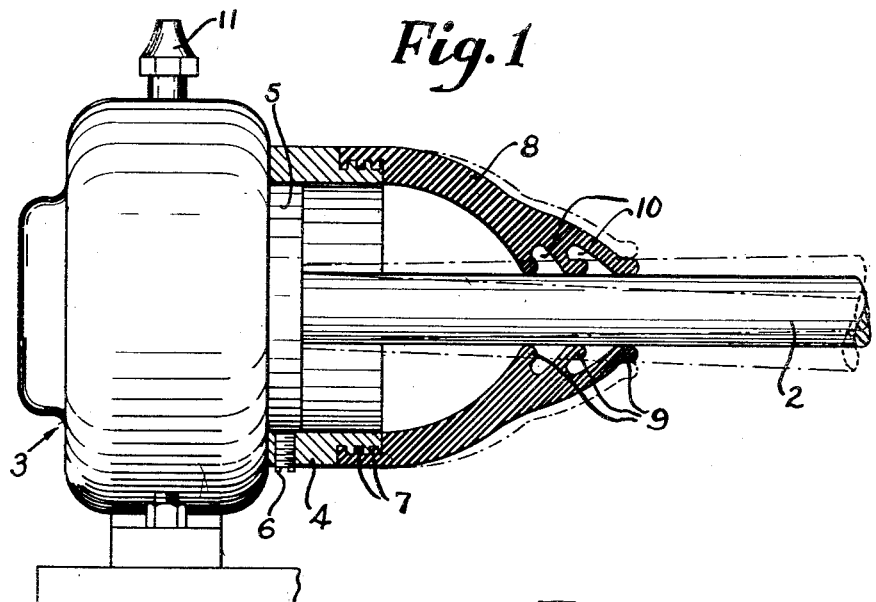
Fig. 1 is a side elevation of a bearing and shaft showing the bearing seal therefor in section.
Figure 2:
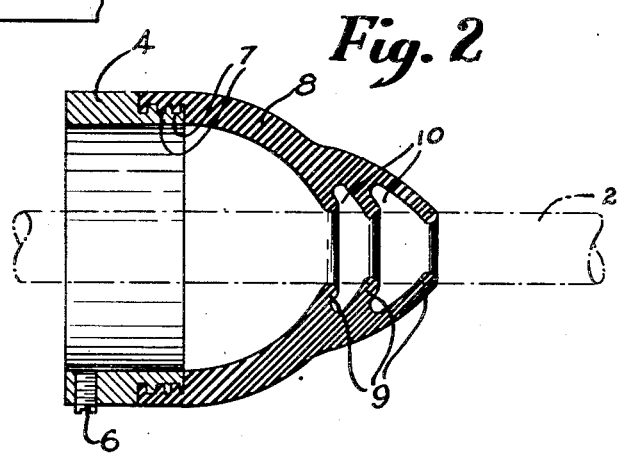
Fig. 2 is a longitudinal section through the bearing seal.

The inner edge of the cup 8 has provision for tight gripping connections with the periphery of the shaft 2 to accommodate angular shifting of the shaft as indicated in dotted lines in Fig. 1. In the form illustrated, this gripping action is provided by a series of circumferential ribs 9 extending about the inner diameter or edge of the cup 8 and having progressively decreasing diameter in their normal positions, shown in Fig. 2, from the bearing outwardly. Grooves 10 are formed between the ribs 9, allowing freedom for angular flexing of the ribs in engagement with the shaft 2, as is evident from Fig. 1.

The interior of the cup may be filled with lubricant, such as grease, through a fitting 11 on the bearing 3 which will serve not only to lubricate the bearings, but also, under the pressure of an injection gun, will flow out to fill the cup 8 and may fill the grooves 10. The lips 9 are angularly disposed, relative to each other, and extending axially outward from the bearing and converging inward radially with respect to the shaft, thus forming a valve which will yield to permit lubricant to fill the grooves 10 and exude therefrom between the shaft 2 and the outermost lip 9 when pressure in excess of the resiliency of the material is exerted in the cup 8. However, due to the particular angular construction of the lips 9, these lips will have a tendency to form a check-valve around the shaft and close tightly to exclude mud or other foreign matter to prevent entry thereof into the cup 8. This will increase the tendency to exclude sand and other foreign matter from the bearing, as well as to lubricate the relative rotation of the shaft with respect to the cup 8, inasmuch as the cup is stationary, being fixed to the housing of the bearing.

The difference in diameter of the ribs 9 has been found to be very effective in excluding sand and foreign matter from the bearing parts because of the gradually decreasing internal diameter of the ribs along the shaft.

While the invention has been illustrated and described in one embodiment, it is recognized that variations and changes may be made therein without departing from the invention except as specified in the claims.

I claim:

1. A seal for performing a sealing action between a non-rotating and a rotating element, a collar adapted to interfit with said non-rotating element in sealing relation and having a rubber-like material bonded thereto and therearound which rubber-like material forms an axially outward extending hollow neck portion that converges radially inward to form a sealing action with said rotating element, said neck portion extending outwardly a distance of at least one-half the diameter of the neck portion at the larger end, said outer end of said neck portion being flexible laterally for yielding relative to the normal axis of said rotating element so as to perform a sealing action therewith at different angular positions, and said neck having a plurality of ribs, with grooves formed therebetween, formed within the inner diameter of said neck near the outer end thereof with the inner diameter of said ribs being slightly less than the outer diameter of said rotating element.

2. Same as claim 1 but in addition thereto, said collar having annular grooves formed therein and therearound to which and in which said rubber like material is bonded.

3. Same as claim 1 but in addition thereto, said ribs having the diameters of each opening formed between each rib progressively decreasing in size outwardly.

4. Same as claim 1 but in addition thereto, said ribs having the faces thereof rounded transversely and disposed at an acute angle with respect to said rotating element, with the ribs converging axially outward and radially inward.

5. Same as claim 1 but in addition thereto, said ribs having the diameters of each opening formed between each rib progressively decreasing in size outwardly and said ribs having the faces thereof rounded transversely and disposed at an acute angle with respect to said rotating element, with the ribs converging axially outward and radially inward so as to form a valve to permit a lubricant to be forced outward thereby yet prevent foreign matter from entrance thereinto.

ISHMAEL W. CORDER.

REFERENCES CITED

The following references are of record in the file of this patent:

UNITED STATES PATENTS

| Number | Name | Date |
| --- | --- | --- |
| 1,903,483 | Skillman | Apr. 11, 1933 |
| 2,172,325 | Victor et al. | Sept. 5, 1939 |
| 2,181,203 | Reynolds | Nov. 28, 1939 |
| 2,316,713 | Procter | Apr. 13, 1943 |
| 2,321,250 | Russell | June 8, 1943 |
| 2,415,888 | Joy | Feb. 18, 1947 |